US005203952A

United States Patent [19]

Clark, Jr. et al.

[11] Patent Number: 5,203,952

[45] Date of Patent: * Apr. 20, 1993

[54] CHECK STRIP ATTACHMENT AND REMOVAL APPARATUS

[75] Inventors: Jack G. Clark, Jr.; Joseph W. Schouster, both of Houston, Tex.

[73] Assignee: BancTec, Inc., Dallas, Tex.

[ * ] Notice: The portion of the term of this patent subsequent to Oct. 30, 2007 has been disclaimed.

[21] Appl. No.: 534,519

[22] Filed: Jun. 6, 1990

Related U.S. Application Data

[63] Continuation of Ser. No. 352,555, May 16, 1989, Pat. No. 4,966,644.

[51] Int. Cl.[5] ............................................. B32B 31/00

[52] U.S. Cl. ................................... 156/554; 156/556; 156/584

[58] Field of Search ....... 156/521, 584, 554, DIG. 33, 156/DIG. 51, 344, 499, 556–558, 569–572, 152; 271/248–252

[56] References Cited

U.S. PATENT DOCUMENTS 2,375,330 5/1945 Sperry ............................ 156/570 X
3,451,872 6/1969 Townsend ...................... 156/584 X
3,770,943 11/1973 Sill ............................... 235/61.12 R
3,897,299 7/1975 Crouse et al. ....................... 156/522
4,221,620 9/1980 Milne .
4,448,631 5/1984 Eaton et al. .
4,607,835 8/1986 Wilson et al. ................... 271/251 X
4,690,724 9/1987 Outlaw ............................... 156/584
4,882,004 11/1989 Watson ........................... 156/570 X
4,966,644 10/1990 Clark, Jr. et al. .............. 156/584 X

*Primary Examiner*—David A. Simmons
*Assistant Examiner*—Chester T. Barry
*Attorney, Agent, or Firm*—Kenneth R. Glaser

[57] ABSTRACT

An apparatus for selectively attaching strips of an encodable material bearing a heat activatable adhesive to a document or for removing the strips therefrom generally comprises a strip attachment assembly and a strip removal assembly. The attachment assembly includes a set of document feed rollers and strip feed rollers which deliver the documents and the strips to an alignment subassembly where the document and the strip are properly aligned. A cutter cuts the strip to match the length of the document and the aligned document and strip pass by a heater which heats the heat activatable adhesive. The strip secured to the document by the heat activatable adhesive is sealed thereto by a pair of sealing rollers. The strip removal assembly comprises a passageway having a heater extending along one side and an obstruction extending across a portion of the passageway. A document having a strip secured thereto may be advanced along the passageway so that the heater heats the heat activatable adhesive connecting the strip to the document. The obstruction engaging only the strip then biases the strip away from the document so as to remove the strip.

3 Claims, 4 Drawing Sheets

Fig. 1.
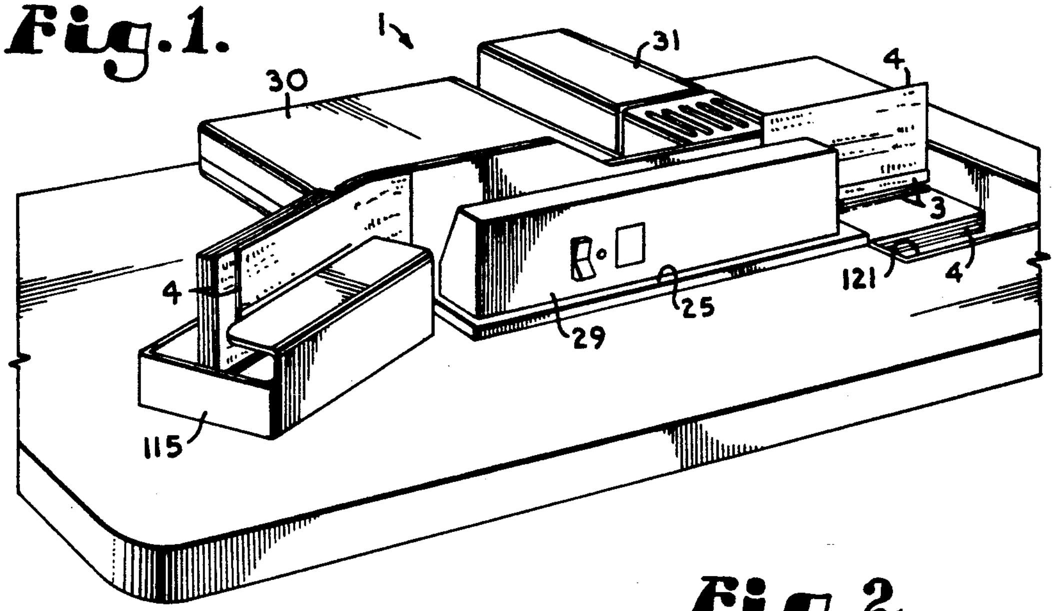
Fig. 2.
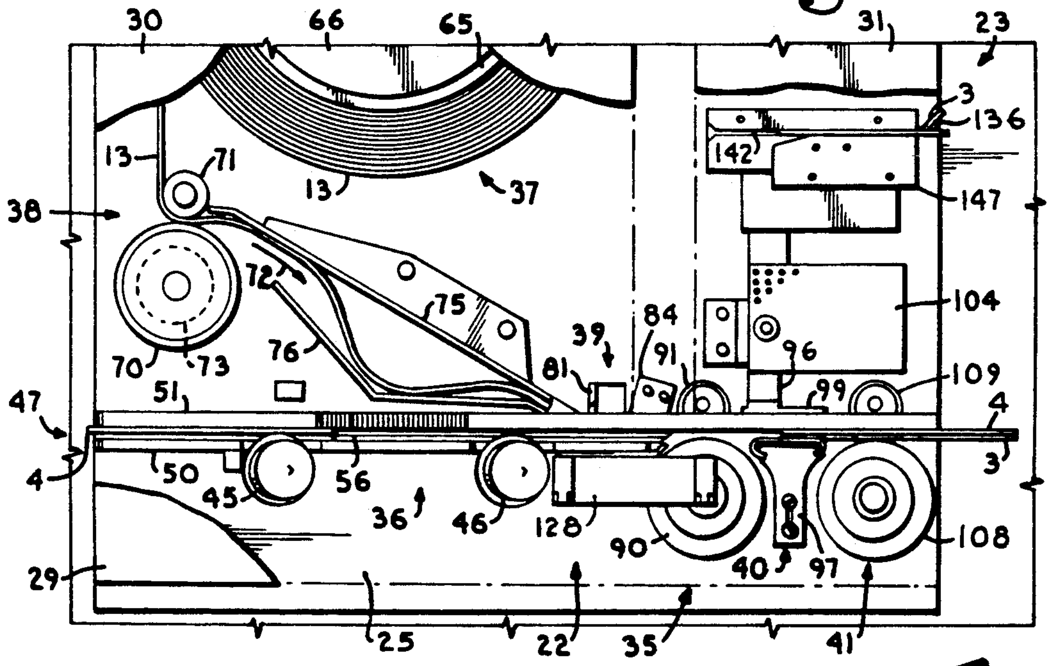
Fig. 3.
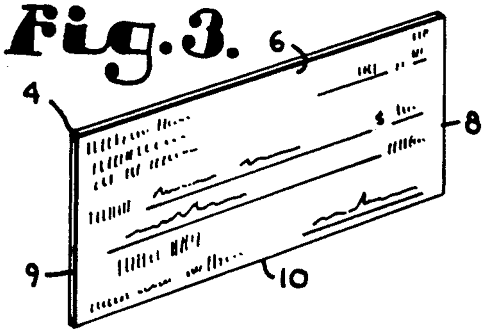
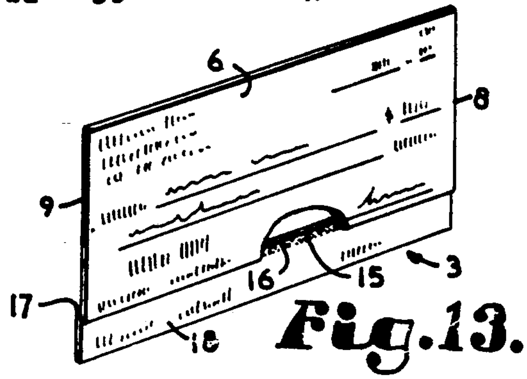
Fig. 13.

Fig. 6.
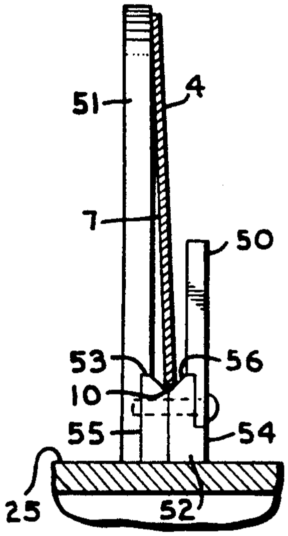
Fig. 7.
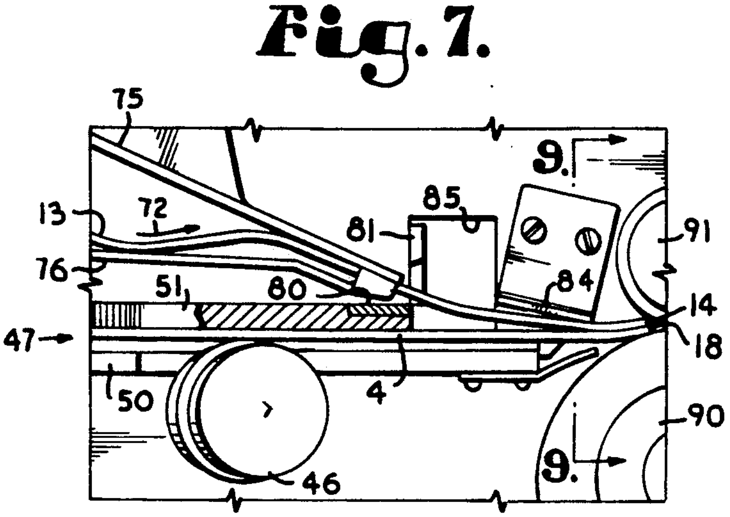
10.
Fig. 8.
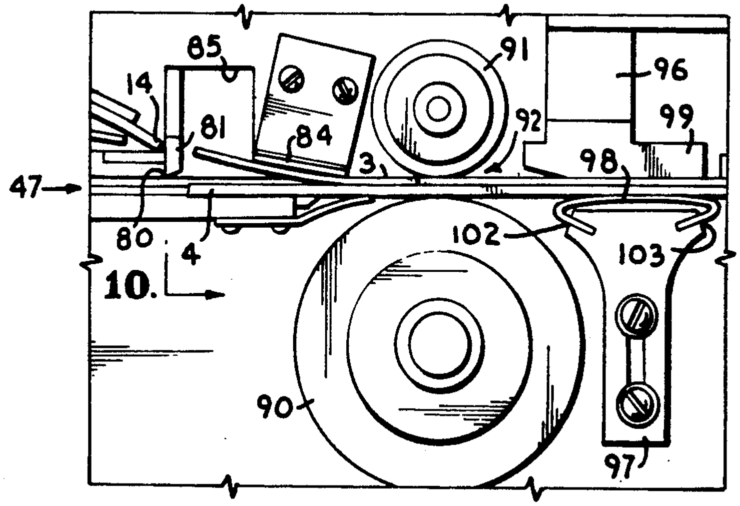
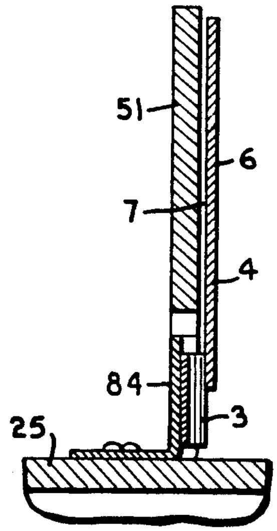
Fig. 9.
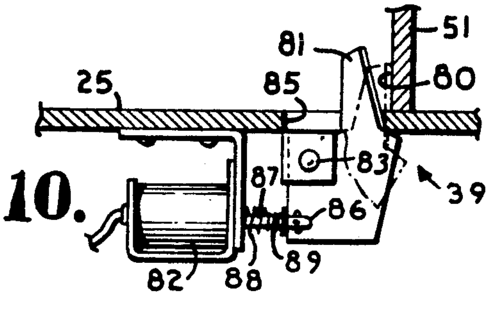
Fig. 10.

Fig. 11.
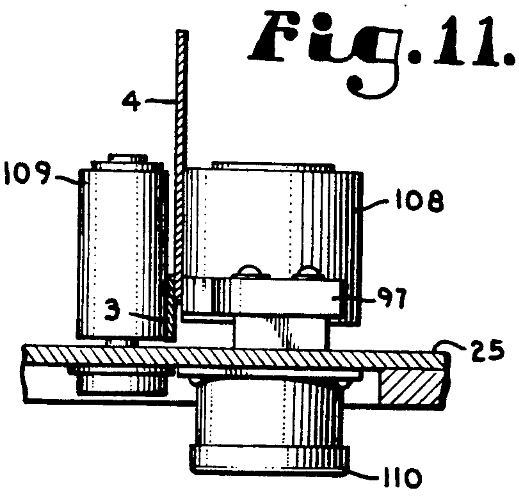
Fig. 12.
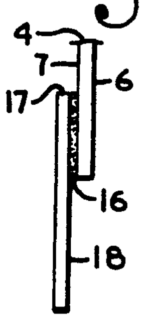
Fig. 14.
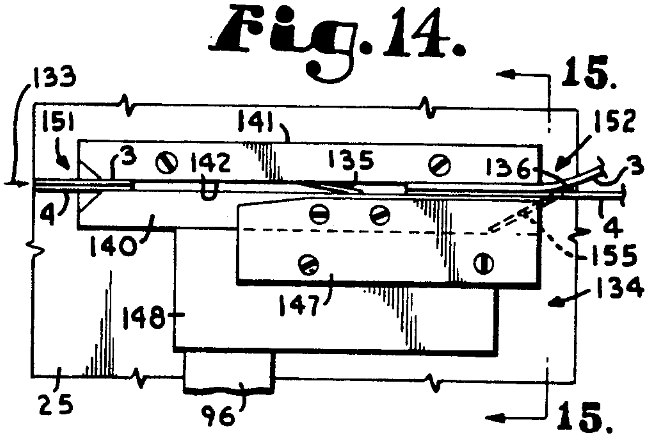
Fig. 15.
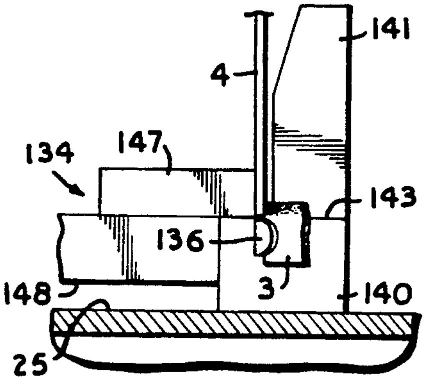
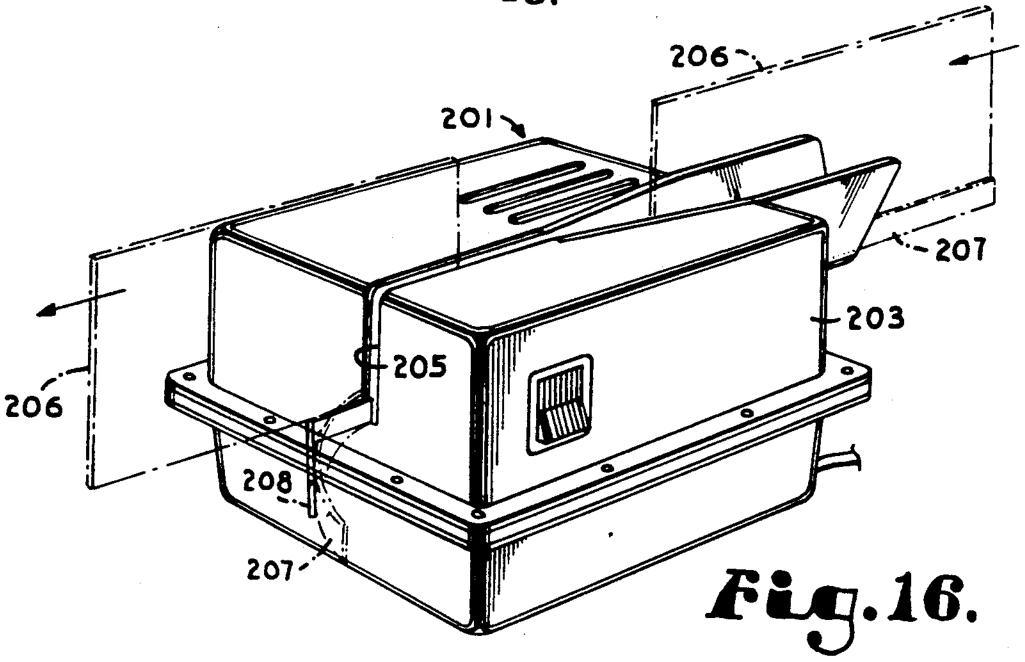
Fig. 16.

CHECK STRIP ATTACHMENT AND REMOVAL APPARATUS

CROSS-REFERENCE TO RELATED APPLICATION

The present application is a continuation of application Ser. No. 07/352,555 filed May 16, 1989, having the same title, now U.S. Pat. No. 4,966,644.

BACKGROUND OF THE INVENTION

The present invention relates to equipment used to alter commercial instruments to allow for proper automatic processing of the instruments and more specifically to an apparatus for selectively securing a strip of encodable material to a document or for removing the strip therefrom.

Due to the enormous numbers of negotiable instruments that pass through the banking system daily, equipment has been developed to automatically process negotiable instruments. The processing of these instrument is generally facilitated by magnetic or optical indicia encoded along the bottom longitudinal edge of the instrument. If the indicia is damaged, obliterated or encoded improperly the instrument cannot be properly processed through the automatic processing equipment. To avoid manual processing of such damaged or improperly encoded instruments, devices have been designed to add a strip of encodable material along the bottom longitudinal edge of the document. A new set of indicia may then be encoded upon the strip allowing automatic processing of the instrument.

U.S. Pat. Nos. 3,897,299 (Crouse, et al.) and 4,448,631 (Eaton, et al.) each disclose an apparatus for attaching a strip of an encodable material to a document. However, each apparatus disclosed in these patents is relatively complicated, expensive and often unreliable. Each of these patents shows an apparatus that incorporates a complex system of rollers or belts to feed a document and a strip of encodable material into and through the apparatus. The complexity of the system often results in jams or the improper alignment of the strip with the document which prevents automatic processing of the document.

Automatic processing of a document bearing an improperly aligned strip in one of such prior art devices requires the removal of the improperly aligned strip followed by proper alignment of another strip. The removal of the strip often damages the document, and must be accomplished manually, by carefully peeling or cutting the strip from the document, which greatly impedes the entire process and is relatively labor intensive.

Also, the complex designs of the prior art systems are in general inflexible as to how documents may be fed into the apparatus. The mechanisms incorporated into the prior art for feeding documents into the apparatus require that the documents be fed into such an apparatus in one direction, usually downward. By limiting the direction in which documents may be fed into the apparatus, the apparatus is greatly limited as to where it may be placed and the types of automatic feeders that may be used to automatically feed individual documents into the apparatus.

Because of the complexity of the current document modification apparatus and of the inability of such machines to easily and non-manually remove improperly aligned strips, a new apparatus is needed that has a simpler more effective design, has the ability to easily remove as well as attach encodable strips to documents, and is capable of receiving documents from more than one direction.

SUMMARY OF THE INVENTION

The present invention provides an apparatus for selectively attaching a strip of encodable material having a heat activatable adhesive portion to a longitudinal edge of a document or for removing the strip therefrom. The apparatus includes a document transit passageway and an encodable material transit passageway. A document advance roller having a slightly angled axis of rotation engages any documents inserted in the document passageway and advances the document both vertically downward and horizontally along the document passageway to a pair of radially abutting alignment rollers.

Similarly, a pair of radially abutting encodable material advance rollers feed a continuous length or strip of encodable material from a supply reel such that the strip is reeved along the encodable material passageway to engage at least a portion of each document at, and preferably before, a nip associated with the alignment rollers. The encodable material passageway is spaced, angled and positioned relative to the document passageway so that when the two passageways meet at or before the alignment rollers the adhesive bearing portion of the encodable material is placed in overlapping and abutting relationship with a longitudinal encodable material receiving segment of the document, preferably extending entirely along a bottom edge of the document.

With the encodable material abutting against the receiving segment of the document, the alignment rollers simultaneously advance in side by side and touching relationship leading edges associated with the document and the encodable material to a heater for heating the heat activatable adhesive. A cutting blade aligned generally perpendicular to the encodable material passageway is selectively activated by computer controlled circuitry activated by photoelectric cells to cut the encodable material into a discrete repair strip preferably having a length after being cut equivalent to that of the document. After the repair strip has been placed in touching relation to the document and the heat activatable adhesive has been heated, the document and the strip in touching relation are guided into a pair of sealing rollers located beyond the heater so as to secure the strip of encodable material to the document and thereafter remove or eject the now modified document with the repair strip secured thereto from the apparatus.

A strip removal mechanism including a strip removal passageway also extends across the apparatus for removing a strip of encodable material from a document. A heater extends along the removal passageway for heating the heat activatable adhesive. The removal passageway may be part of the document passageway in which case the strip removal mechanism must be selectively activatable and application of the repair strip must be selectable or alternatively the removal passageway and document passageway may be separate paths. Biasing means such as an obstruction extending into the passageway biases the repair strip with the heated adhesive away from the document into a different path than the document thereby separating the repair strip from the document. In a prefered embodiment documents are fed from an automatic document feeder device through the strip removal mechanism.

OBJECTS OF THE INVENTION

The principal objects of the invention are: to provide an improved apparatus for attaching a strip of encodable material to a document that is relatively simple in design and inexpensive to manufacture; to provide such an apparatus whereby a document may be fed into the apparatus from more than one direction; to provide such an apparatus wherein the strip of encodable material may be selectively and easily removed from the document to which it is attached; to provide a mechanism for removing a strip of encodable material from a document to which it has been attached, utilizing a heater to heat adhesive holding the strip to the document and using a biasing device to deflect the strip with the heated adhesive away from the document; to provide a strip attaching apparatus and a strip removing mechanism tht are relatively inexpensive to manufacture, easy to use and that are particularly well adapted for the intended uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a document modification apparatus including a document strip attaching apparatus with a front and a rear cover and having a strip removing mechanism, an automatic document feeder, and a document collector mounted on a table top and illustrating the attachment of repair strips to checks.

FIG. 2 is an enlarged fragmentary top plan view of the document modification apparatus with portions broken away to show interior detail.

FIG. 3 is an enlarged perspective view of one of the checks before repair.

FIG. 6 is an enlarged and fragmentary cross-sectional view of the document modification apparatus, taken along line 6—6 of FIG. 4, showing a check inserted therein.

FIG. 7 is an enlarged and fragmentary top plan view of the document modification apparatus with the covers removed, showing the alignment of a check with a strip of encodable material.

FIG. 8 is an enlarged and fragmentary top plan view of the document modification apparatus with the covers removed, showing a check aligned with a strip of encodable material that has been cut to match the length of the check.

FIG. 9 is an enlarged and fragmentary cross-sectional view of document modification apparatus, taken along line 99 of FIG. 7, showing the alignment of a strip of encodable material with a check.

FIG. 10 is an enlarged and fragmentary cross-sectional view of document modification apparatus taken along line 10—10 of FIG. 8, showing in phantom lines the cutting motion of a cutter assembly.

FIG. 11 is an enlarged and fragmentary cross-sectional view of the document modification apparatus taken along line 11—11 of FIG. 4, showing a strip of encodable material being adhesively attached to a check.

FIG. 12 is an enlarged, fragmentary and cross-sectional view of a repaired check, showing a strip of encodable material adhesively attached to the repaired check.

FIG. 13 is an enlarged and perspective view of a repaired check showing a strip of encodable material adhesively secured to the check with portions cut away to show the heat-activatable adhesive of the strip of encodable material.

FIG. 14 is an enlarged and fragmentary top plan view of the document modification apparatus with the covers removed to show detail thereof showing the strip removing mechanism and illustrating a strip of encodable material being removed from a check.

FIG. 15 is an enlarged and fragmentary cross-sectional view of the document modification apparatus, taken along line 15—15 of the FIG. 14, showing the strip removing mechanism and illustrating a strip of encodable material being removed from a check.

FIG. 16 is a perspective view of a modified strip removal mechanism.

DETAILED DESCRIPTION OF THE INVENTION

Figure 4:
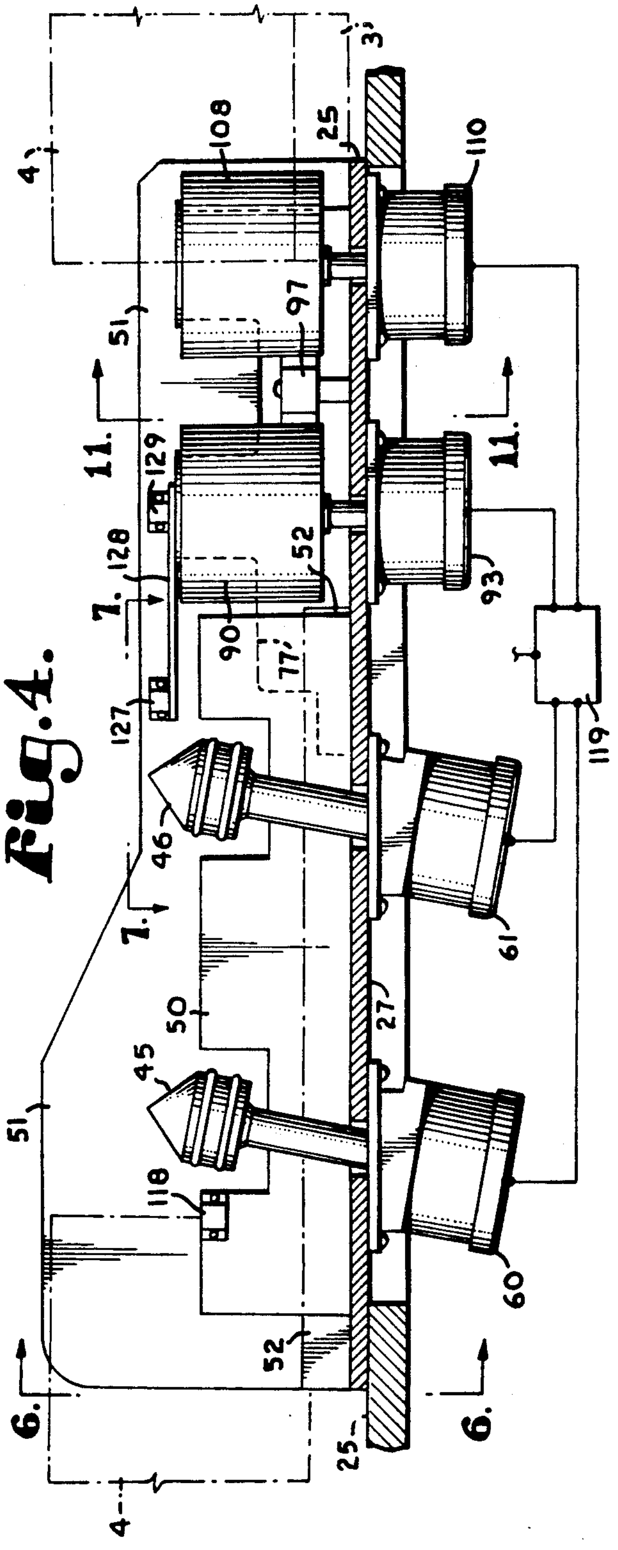
FIG. 4 is an enlarged, fragmentary, partially schematic, front elevational view of the document modification apparatus with the covers removed to show interior detail therof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, reference numeral 1 generally represents a document modification apparatus for attaching a strip of encodable material or paper strip 3, adapted to receive encoded indicia, to a document or check 4 and to selectively remove the paper strip 3 therefrom. The check 4, as shown in FIG. 3, generally comprises a check face 6, a check back 7, a check leading edge 8, a check trailing edge 9, and a check lower longitudinal edge 10.

The paper strip 3 is formed by cutting a continuous length of an encodable material or supply paper 13, having a supply paper leading edge 14, into discrete strips. The strip 3 is preferably cut to be the same length as the check 4, even if different length checks are sequentially fed through the apparatus 1, but it is possible to adapt the apparatus 1 to apply strips that are different in length as compared to the checks, if so desired. A band, sfrip or layer 15 of a heat activatable adhesive 16 extends across both the supply paper 14 and the paper strip 3 along an upper edge 17 thereof. The portion of the paper 13 and the subsequently cut discrete paper strips 3 below the heat activatable adhesive 16 is generally referred to as an encodable portion 18.

The document modification apparatus 1 attaches the paper strip 3 to the check 4 generally along the check lower longitudinal edge 10 so that the heat activatable adhesive 16 abuts against the check back 7 and the encodable portion 18 extends below the check lower longitudinal edge 10, as shown in FIG. 13.

Referring to FIG. 2, the document modification apparatus 1 includes a strip attachment assembly 22 for attaching the paper strip 3 to the check 4 and a strip removal assembly 23 for removing a paper strip 3 from a check 4. Both the strip attachment assembly 22 and the strip removal assembly 23 are secured to a support surface 25 having an under side 27. The strip attachment assembly 22 is enclosed by a rear strip attachment assembly cover 29 and 30. Similarly the strip removal assembly 23 is enclosed by a strip removal assembly cover 31.

The strip attachment assembly 22 generally comprises an alignment assembly 35 which operates to align the check leading edge 8 with the supply paper leading edge 14, a check feed assembly 36 for advancing a check 4 to the alignment assembly 35, a supply paper storage assembly 37 for retaining a quantity of the supply paper 13, a supply paper feed assembly 38 for advancing the supply paper 13 to the alignment assembly 35, a cutter assembly 39 for cutting the supply paper 13 into the paper strips 3, a heater assembly 40 for activating the heat activatable adhesive 16 of the paper strip 3, and a sealing assembly 41 for sealing the paper strip 3 to the check 4.

As shown in FIG. 4, the check feed assembly 36 generally comprises first and second check advance rollers 45 and 46 aligned along a document transit passageway or check path 47. The check path 47 is formed by a front and a rear check guide 50 and 51 each secured to a check track 52, as shown in FIG. 6. The front and rear strip attachment assembly covers 29 and 30 are spaced on opposite sides of the check path 47 to provide access thereto. The check track 52, having a top surface 53 and front and rear lateral surfaces 54 and 55, is secured to the support structure 25 and extends thereacross to the alignment assembly 35. A V-shaped groove 56, having a lower edge 57, extends along the top surface 53 of the check track 52 for receiving the check lower longitudinal edge 10 to which the paper strip 3 is to be attached.

The width of the rear lateral surface 55 closely approximates the width of the supply paper 13. Further, the distance from the support surface 25 to the lower edge 57 of the V-shaped groove closely approximates the width of the encodable portion of the supply paper 13 while the depth of the V-shaped groove 56 closely approximates the width of the layer 15 of the heat activatable adhesive 16. These dimensions of the check track 52 operate to place the supply paper 13 in overlapping and abutting relation with the check 4 at the end of the check track 52 near the alignment assembly 35.

As shown in FIG. 6, the rear check guide 51 is secured to the rear lateral surface 55 of the check track 52 in an abutting, overlapping relation so that the rear check guide 51 extends above the check track 52 in such a manner that the check back 7 will abut against the rear check guide 51 when the check lower longitudinal edge 10 is inserted in the V-shaped groove 56.

The first and second check advance rollers 45 and 46 radially touch or very nearly touch the rear check guide 51, but are sufficiently resilient to allow a check to be driven thereby along the rear guide 51 and, in particular, between the rollers 45 and 46 and the rear guide 51. The rollers 45 and 46 are driven by first and second check roller motors 60 and 61. The first and second check roller motors 60 and 61 are mounted on the underside 27 of the support surface 25 in an angled relation so that the axis of rotation of the first and second check advance rollers 45 and 46 form acute angles with the support surface 25. In particular, the rollers 45 and 46 are angled and rotated so as to urge a check 4 in the check path 47 simultaneously downwardly and to the right such that a check 4 can enter the check path 47 from above, from the left or from any angle therebetween. That is, the first and second check advance rollers 45 and 46 are mounted on the support surface 25 in an angled relation so as to impart both a horizontal and a vertical directional force on a check 4 inserted between the rear check guide 51 and the first and second advance rollers 45 and 46, thereby advancing check 4 into and along the v-shaped groove 56 of the check track 52.

As shown in FIG. 2, a quantity of the supply paper 13 may be maintained at the supply paper storage assembly 37. The supply paper storage assembly 37 comprises a continuous length of the supply paper 13 wrapped around a supply reel 65. The supply reel 65 is rotatably mounted on a hub 66 which is secured to the support surface 25.

The supply paper feed assembly 38 comprises a supply paper advance roller 70 radially abuting or closely spaced from a supply paper idler roller 71. When rotated, the advance roller 70 operably advances the supply paper 13 from the supply reel 65 to the alignment assembly 35 along an encodable material transit passageway or supply paper path 72. The supply paper advance roller 70 is driven by a supply paper roller motor 73 which is mounted on the underside 27 of the support surface 25.

The supply paper path 72 which is generally defined by first and second supply paper guides 75 and 76 extends from the supply paper feed assembly 37 to the alignment assembly 35. Both the first and second supply paper guides 75 and 76 are secured to the support surface 25 so as to extend generally perpendicular thereto. The first supply paper guide 75 generally extends linearly from the supply paper feed assembly 38 to the rear check guide 51 so as to form an acute angle with the check guide 51. The second supply paper guide 76 also extends from the supply paper feed assembly 38 to the rear check guide 51, but is angled so as to extend away from and then back towards the first supply paper guide 75. The first and second supply guides 75 and 76 are space relative to each other at a distance substantially greater than the width of the supply paper 13.

Figure 5:
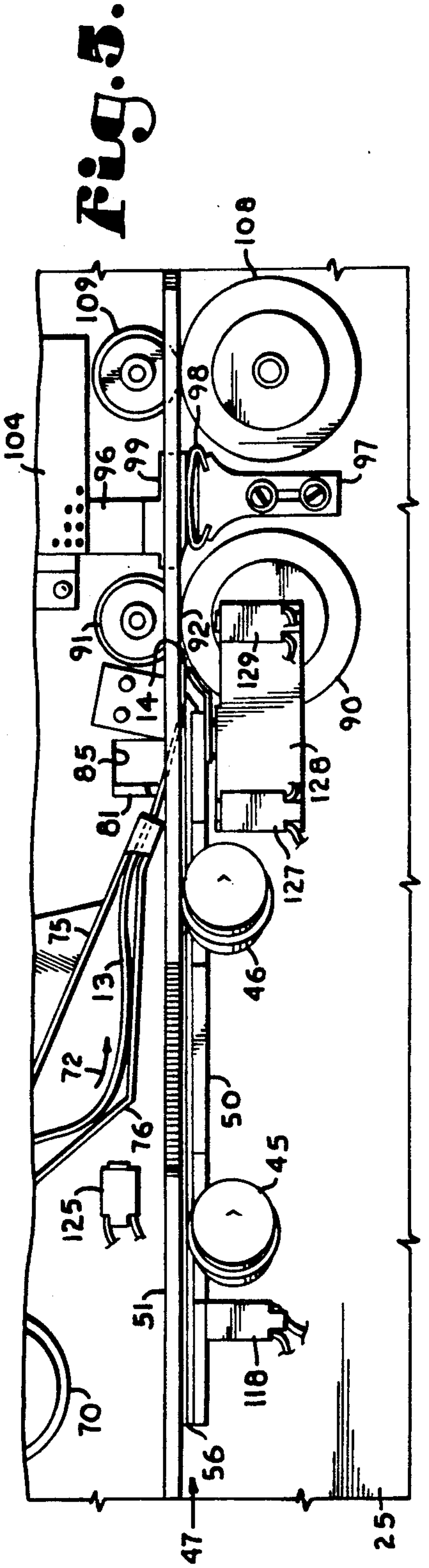
FIG. 5 is an enlarged and fragmentary top plan view of the document apparatus with the covers removed to show interior detail thereof.

Upon reaching the rear check guide 51, the supply paper path 72 passes through an opening 77 in the rear check guide 51, as shown in FIG. 5, and then proceeds along the rear lateral surface 55 of the check track 52 to the end of the check track 52 where the supply paper path 72 intersects the check path 47.

The cutter assembly 39, as shown in FIGS. 7, 8, and 10, extends across the supply paper path 72 and operates to cut the supply paper 13 into discrete lengths relative to the length of the check 4 being processed, thereby forming the paper strips 3. The cutter assembly 39 comprises a passive blade 80, an active blade 81, and a solenoid 82. The passive blade 80 is embedded in the rear check guide 51 so that the passive blade 80 defines one edge of the opening 77. The supply paper path 72 extends across the passive blade cutting edge 80 where the supply paper path 72 passes through the opening 77. A strip guide 84 operably guides the strip 3 during and after being cut from the supply paper 13, as seen in FIG. 8.

The active blade 81 is pivotally mounted on a pivot pin 83 on the underside 27 of the support surface 25. The active blade 81 extends through an aperture 85 in the support surface 25 and alongside the supply paper path 72 opposite the passive blade 80. The active blade 81 is connected to the solenoid 82 which is attached to the underside 27 of the support surface 25. When the solenoid 82 is activated, the solenoid 82 pivots the active blade 81 causing the active blade 81 to extend across the supply paper path 72 so as to engage the passive blade 80. The solenoid 82 includes a central shaft 86 attached to the lower end of the active blade 81 and having a biasing spring 87. The spring 87 includes a loosely coiled section 88 close to the body of the solenoid 82 and a tightly coiled section 89 closer to the active blade 81 and abutting against a stop on the shaft 86.

The alignment assembly 35, as shown in FIG. 5, comprises an alignment roller 90 (also referred to as a meet roller) radially and resiliently abuting or nearly touching an alignment idler roller 91. The alignment roller 90 and alignment idler roller 91 are rotatably mounted on the support surface 25 on opposite sides of the check path 47. The alignment roller 90 radially and resiliently abuts or nearly touches the alignment idler roller 91 so as to form an alignment roller nip 92 (also referred to as a meet nip) at the opening 77 of the rear check guide 51. The alignment roller 90 is driven by an alignment roller motor 93 mounted on the underside 27 of the support surface 25.

The heater assembly 40, as shown in FIG. 5, generally comprises a strip attachment heater block 96, a heat transfer block 97, and a biasing strip 98. The strip attachment heater block 96 and the heat transfer block 97 are mounted on opposite sides of the check path 47, just beyond the alignment assembly 35.

The strip attachment heater block 96 which is made of a heat conducting material is generally rectangular except for an engaging portion 99 extending from one end of the strip attachment heater block 96 and through the opening 77 in the rear check guide 51 so as to run along the side of the check path 47.

The heat transfer block is positioned along the check path 47 opposite the strip attachment heater block 96 and is spaced a relatively narrow distance relative thereto. First and second strip receiving slots 102 and 103 extend into the sides of the heat transfer block 97. The biasing strip 98, formed from a heat conducting flexible material (such as copper), is bent across the heat transfer block 97 and secured in the first and second strip receiving slots 102 and 103. The biasing strip 98 curves away from the heat transfer block 97 and biases against the engaging portion 99 of the strip attachment heater block 96.

The strip attachment heater block 96 is heated by a conventional electrical heating element such as a resistor or "fire rod". An insulation sheet 104 provides insulation for the strip attachment heater block 96 to which the insulating 104 is secured.

The sealing assembly 41, as shown in FIG. 5, located beyond the heater assembly 40, comprises a sealing roller 108 radially and resiliently abutting or almost touching a sealing idler roller 109. The sealing roller 108 and the sealing idler roller 109 are rotatably mounted on opposite sides of the check path 47. The sealing roller 108 is rotatably driven by a sealing roller motor 110 mounted on the underside 27 of the support surface 25.

A check 4, to be modified, is inserted between the first check advance roller 45 and the rear check guide 51 either from directly above or to one side. The check 4, may be inserted manually or using an automatic check feeder 115, as shown in FIG. 1. As the check 4 is inserted between the first check advance roller 45 and the rear check guide 51, the check 4 passes in front of a document feed position sensor, suchas the illustrated photosensor 118, secured to the front check guide 50, as shown in FIG. 5 and triggers the photosensor 118 as long as the check 4 is in front thereof. The document feed photosensor 118 is in communication with a control circuitry 119. The control circuitry 119 preferably includes an electric wiring circuit connecting generally all electrically operated parts of the apparatus 1 with a control computer adapted to receive information from and operably control the remaining parts of the control circuitry 119. Initial triggering of the document feed photosensor 118 by the check front edge 8 passing in front thereof, causes the control circuitry 119 to activate the first and second check roller motors 60 and 61, that operatively rotate the first and second check advance rollers 45 and 46. The first and second check advance rollers 45 and 46 engage the check 4 and advance the check's lower longitudinal edge 10 down into and along the V-shaped groove 56 of the check track 52 until the check 4 reaches the alignment assembly 35.

Triggering of the document feed photosensor 118 also causes the control circuitry 119 to activate the sealing roller motor 110 which rotates the sealing roller 108 so as to expel any checks 4 previously modified. The document modification apparatus 1 may be used in combination with a check stacker 121, as shown in FIG. 1, to stack checks 4 expelled therefrom.

Finally, triggering of the document feed photosensor 118 causes the control circuitry 110 to activate the supply paper roller motor 73 which rotates the supply paper advance roller 70. While rotating, the supply paper advance roller 70 cooperates with the supply paper idler roller 71 to advance the supply paper 13 threaded therebetween along the supply paper path 72. The supply paper 13 is advanced along the supply paper path 72 until the supply paper leading edge 14 reaches the alignment roller nip 92, where advancement of the supply paper leading edge 14 is stopped.

However, the supply paper advance roller 70 continues to feed the supply paper 13 into the supply paper path 72 so that the excess supply paper 13 forms a somewhat sinusoidal or S-shaped curve 123 between the first and second supply paper guides 75 and 76. The S-shaped curve 23 provides backup for effectively feeding the supply paper 13 through the alignment assembly 35 and acts somewhat biasingly to drive the leading edge 14 of the supply paper 13 toward the nip 92 when the cutter assembly active blade 81 is retracted to a standing position, such as is shown in solid lines in FIG. 10. As shown in FIG. 5, when the S-shaped curve 123 becomes large enough so as to abut against the second supply paper guide 76, the supply paper 13 triggers a supply paper position sensor such as illustrated photosensor 125 secured to the support surface 25 and in communication with the control circuitry 119. Triggering of the supply paper photosensor 125 causes the control circuitry 119 to deactivate the supply paper roller motor 73 which stops the rotation of the supply paper advance roller 70, thereby stopping further advancement of the supply paper 13 into the supply paper path 72.

As the check 4 is advanced along the check path 47, the check leading edge 8 triggers a third position sensor such as illustrated check advance photosensor 127 which is in communication with the control circuitry 119. The check advance photosensor is secured to a sensor support member 128. The sensor support member 128 is secured to the front check guide 50 and extends along the check path 47 generally from the second check advance roller 46 to the alignment roller nip 92. As the check leading edge 8 passes in front of and triggers the check advance photosensor 127, the check advance photosensor 127 initiates a framing-type sequence in the control circuitry 119. The framing-type sequence generally operates to activate the cutter assembly 39 when the check trailing edge 9 passes the check advance photosensor 127, thereby again triggering the photosensor 127 to signal such event to the control circuitry 19 and, consequently, the control computer thereof. However, before the check trailing edge 9 passes by the check advance sensor 127, the check leading edge 8 reaches the assembly roller nip 92.

Upon reaching the assembly roller nip 92, the check leading edge 8 is aligned with the supply paper leading edge 14 which has already been advanced to and positioned at the alignment roller nip 92, as shown in FIG. 7. At the same time the intersection of the check path 47 and the supply paper path 72 at the end of the check track 52 operates to place the check lower longintudinal edge 10 in overlapping and abutting relation with the layer 15 of the heat activatable adhesive 16 on the paper strip 3 so that the encodable portion 18 extends therebelow, as shown in FIG. 9.

As the check leading edge 8 reaches the alignment roller nip 92 the check leading edge 8 triggers a fourth position sensor suchas illustrated alignment roller photosensor 129 mounted on the sensor support member 128 and in communication with the control circuitry 119. Triggering of the alignment roller photosensor 129 causes the control circuitry 119 to activate the alignment roller motor 93 and the sealing roller motor 110. The alignment roller motor 93 rotates the alignment roller 90. The alignment roller 90 cooperates with the alignment idler roller 91 to advance the check 4 and the supply paper 13 in an aligned relationship along the check path 47 to the heater assembly 40.

As the check 4 and the supply paper 13 are advanced by the alignment roller 90, the check trailing edge 9 passes the check advance photosensor 127 so as to again trigger the check advance photosensor 127. This subsequent triggering of the check advance photosensor 127 causes the control circuitry 119 to activate the solenoid 82. When activated, the solenoid 82 causes the active blade 81 to pivot to a cutting position (shown in phantom lines in FIG. 10), so that the active blade 81 engages the passive blade 80 with the supply paper 13 therebetween. As the active blade 81 engages the passive blade 80, the supply paper 13 extending across the passive blade 80 is severed so as to form a paper strip 3, as shown in FIG. 8.

The check advance photosensor 127 is positioned along the check path 47 a distance from the alignment roller nip 92 that approximately equals the distance from the alignment roller nip 92 to the passive blade 80 along the supply paper path 72 plus the distance traveled by the check 4 during the time between the actual subsequent triggering of the check advance photosensor 127 and the actual cutting of the supply paper 13. The time differential is due to mechanical and electrical lag. The effect of the spacing of the check advance photosensor 127, as described above, is that the cutter assembly 39 cuts the supply paper 13 to form a paper strip 3 having a length that matches the length of the check 4 to which the paper strip 3 is to be attached, or other length as is desired.

After cutting the supply paper 13, the active blade 81 remains in a cutting position while the check 4 and the paper strip 3 are advanced by the alignment roller 90 along the check path 47 to the heater assembly 40. By remaining in the cutting position, the active blade 81 operably blocks the advancement of the supply paper 13 along the supply paper path 72 and between the alignment roller 90 and the alignment idler roller 91 when the alignment roller 90 is advancing the check 4 and the paper strip 3 therebetween. However, when the check trailing edge 9 passes and subsequently again triggers the alignment roller photosensor 129, that in turn signals the the control circuitry 119 such that the circuitry 119 deactivates the solenoid 82 causing the active blade 81 to pivot out of the cutting position thereby allowing the advancement of the supply paper 13 along the supply paper path 72.

When the active blade 81 is pivoted out of the cutting position, an inherent spring force in the S-shaped curve 123 of the supply paper 13 advances the supply paper leading edge 14 along the supply paper path 72 to the alignment roller nip 92. Because the alignment roller 90 is not rotating, the supply paper leading edge 14 is prevented from advancing beyond the alignment roller nip 92. As the supply paper leading edge 14 advances to the alignment roller nip 92, the S-shaped curve 123 decreases in amplitude thereby triggering the supply paper photosensor 125. The movement of the paper 13 away from the photosensor 125 again triggers the supply paper photosensor 125 to signal the circuitry 119 and to thereby cause the control circuitry 119 to activate the supply paper roller motor 73 thereby rotating the supply paper advance roller 70. The supply paper advance roller 70 advances supply paper 13 into the supply paper path 72 until the S-shaped curve 123 once again becomes large enough to again trigger the supply paper photosensor 125, which causes the control circuitry 119 to deactivate the supply paper roller motor 73 thereby haulting the advancement of the supply paper 13 into the supply paper path 72.

When activated, the alignment roller 90 advances the check 4 and the paper strip 3 in an aligned relation through the heater assembly 40 and into the sealing assembly 41. At the heater assembly 40 the check 4 and the paper strip 3 pass between the engaging portion 99 of the strip attachment heater block and the biasing strip 98. The biasing strip 98 biases the check 4 and the paper strip 3 in the aligned relation against the engaging portion 99 of the strip attachment heater block 96. The strip attachment heater block 96 heats the heat-activatable adhesive 16 by conduction causing the paper strip 3 to adhere to the check 4 in the aligned relation.

After passsing through the heater assembly 40 the check 4 and the paper strip 3 adhered thereto are advanced to the sealing assembly 41. The sealing roller motor 110, having been activated by the check leading edge 8 triggering the alignment roller photosensor 129, rotates the sealing roller 108. The sealing roller 108 and the sealing idler roller 109 engage the check 4 and the paper strip 3 adhered thereto so as to press the paper strip 3 against the check 4 sealing the paper strip 3 thereto. The sealing roller 108 and the sealing idler roller 109 also advance the check 4 and the paper strip 3 sealed thereto out of the document modification apparatus 1 and into the check stacker 121, when used.

The strip removal assembly 23, as shown in FIG. 14, generally comprises a strip removal path 133, a strip removal heater assembly 134, a biasing member 135, and a strip removal finger 136. As shown in FIG. 15, the strip removal path 133 is defined by a strip removable guide member 140, a modified check guide 141, and the strip remover heater assembly 134. The strip removal guide member 140 generally has a rectangular cross-section and is secured to the support surface 25. A strip removal groove 142 extends longitudinally across an upper surface 143 of the strip removal guide member 140 and is adapted to receive a check 4 having a paper strip 3 secured thereto. The depth of the strip removal groove 142 closely approximates the width of the encodable portion 18 of the paper strip 3 so that when a check 4 with a paper strip 3 attached thereto is inserted in the strip removal groove 142, the layer 15 of the heat activatable adhesive 16, which secures the paper strip 3 to the check 4 extends above the strip removable groove 142.

The modified check guide 141 is secured to the upper surface 143 of the strip removal guide member 140 along one side of the strip removal groove 142.

The strip removal heater assembly 134, as shown in FIG. 14, generally comprises a strip removal heater block 147 secured to the upper surface 143 of the strip removal guide member 140 along the side of the strip removal groove 142 opposite the modified check guide 141. The strip removal heater block 147 is made of a heat-conducting material and is connected to the strip attachment heater block 96 by a heat-conducting block 148. The heat-conducting block 148 is also made of a heat-conducting material thereby allowing the transfer of heat from the strip attachment heater block 96 to the strip removal heater block 148. It is foreseen that the strip removal heater block 147 may be secured to an independent heat source. The biasing member 135 generally comprises a strip of a biasable heat-conducting material. The biasing member 135 is secured to the modified check guide 141 and extends across the strip removal path 133 so as to bias a check 4 against the strip removal heater block 147.

The strip removal path 133 has a modified check feed end 151 and a strip removal end 152. At the strip removal end 152, the strip removal finger 136 extends across the strip removal path 133, as shown in FIG. 15. The strip removal finger 136 is made of a semi-rigid material and extends from a finger retaining slot 155 in the strip removal guide member 140 across the strip removal path 133. Access to the strip removal path 133 is provided for by a repaired check access slot 159.

When a paper strip 3 is to be removed from a check 4, the check 4 having a paper strip 3 secured thereto, is inserted in the modified check feed end 151 of the strip removal path 133 so that the encodable portion 18 of the paper strip 3 extends into the strip removal groove 142. The check 4 is then advanced along the strip removal path 133. As the check 4 passes along the strip removal heater block 137, the biasing member 135 biases the check 4 against the strip removal heater block 147 so that the strip removal heater block 147 heats the heat-activatable adhesive 16 securing the paper strip 3 to the check 4. As the check 4 is advanced to the strip removal end 152 of the strip removal path 133, the strip removal finger 136 engages the encodable portion 18 of the paper strip 3 and biases the paper strip 3 away from the check 4. As the check 4 is passed beyond the strip removal end 152, the paper strip 3 is completely separated from the check 4.

Shown in FIG. 16, is a modified strip removal assembly 201 similar to the assembly 23, but freestanding from the apparatus 1. The strip removal assembly 201 is enclosed in a housing 203. A modified check access slot 205 in the housing 203 provides access to the strip removal assembly 201. A check 206 having a paper strip 207 improperly secured thereto is inserted in the strip removal assembly 201 through the modified check access slot 205 and removed in the manner described for the strip removal assembly 23 of the previous embodiment. A finger 208 positioned to engage the strip 207 but not the check 206 upon exit thereof from the slot 205 extends from the slot 205 and urges the heated strip 207 from the check 206 as shown in FIG. 16. The components of removal assembly (not shown) 201 are similar to those of assembly 23, and, in particular, include a heater such as heater block 147.

It is also foreseen that the strip removal assembly 23 of the first embodiment could be located in the check path 47 for automated removal with the modifications that the strip removal finger 136 could be selectively moved from an engaging position (to use the removal assembly) to a non-engaging position so that the apparatus 1 could be used to apply rather than remove strip 3. When removing strip in such an embodiment, the heater assembly 40 would preferably be used as the heater block 147 and the supply paper 13 would be removed during strip removal so that a check 4 with a strip 3 already thereon could be fed through the path 47 of the apparatus 1 and the strip would be removed rather than a strip added thereto.

It is to be understood that while certain forms of the present invention have been illustrated and described herein, it is not to be limited to the specific forms or arrangement of parts described and shown.

What is claimed and desired to be secured by Letters Patent is as follows:

1. Apparatus for both attaching strips of encodable material to and removing strips of encodable material from checks and other documents, comprising:

(a) a document transit passageway extending between an entrance document feet station and an exit station, (b) document transport means for advancing, along the same said document transit passageway between said document feed station and said exit station, first type documents to which strips of encodable material are already respectively attached as well as second type documents to which strips of encodable material are to be respectively attached, (c) attachment means disposed adjacent said document transit passageway for attaching respective strips of encodable material to said second type documents, and (d) removal means disposed adjacent said document transit passageway, said removal means, when engaged, removing respective strips of encodable material from said first type documents, (e) said removal means being movable between engaging and non-engaging conditions.

2. The apparatus as defined by claim 1 wherein said removal means comprises a strip removal finger biasing the strip of encodable material from the document.

3. The apparatus as defined by claim 1 wherein said attaching and said removal are effected during said advancing.

* * * * *

UNITED STATES PATENT AND TRADEMARK OFFICE
CERTIFICATE OF CORRECTION

PATENT NO. : 5,203,952

DATED : April 20, 1993

INVENTOR(S) : Jack G. Clark, Jr.; Joseph W. Schouster

It is certified that error appears in the above-identified patent and that said Letters Patent is hereby corrected as shown below:

In the Claims:

Column 12, line 51, change "feet" to read -- feed --

Signed and Sealed this

Sixteenth Day of August, 1994

Attest:

Bruce Lehman

BRUCE LEHMAN

*Attesting Officer* *Commissioner of Patents and Trademarks*